US008581445B2

(12) United States Patent
Ichikawa (10) Patent No.: US 8,581,445 B2
(45) Date of Patent: Nov. 12, 2013

(54) WIRELESS ELECTRIC POWER FEEDING EQUIPMENT (75) Inventor: Shinji Ichikawa, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/580,518

(22) PCT Filed: Dec. 1, 2010

(86) PCT No.: PCT/JP2010/071438
§ 371 (c)(1),
(2), (4) Date: Aug. 22, 2012

(87) PCT Pub. No.: WO2012/073348
PCT Pub. Date: Jun. 7, 2012

(65) Prior Publication Data
US 2013/0127242 A1  May 23, 2013

(51) Int. Cl.
H01F 38/00 (2006.01)
(52) U.S. Cl.
USPC .......................................................... 307/104
(58) Field of Classification Search
USPC .......................................................... 307/104
See application file for complete search history.

(56) References Cited

U.S. PATENT DOCUMENTS

| 7,741,734 | B2 | 6/2010 | Joannopoulos et al. |
| 2007/0222542 | A1 | 9/2007 | Joannopoulos et al. |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |
| 2010/0065352 | A1 | 3/2010 | Ichikawa |
| 2010/0096934 | A1 | 4/2010 | Joannopoulos et al. |
| 2010/0102639 | A1 | 4/2010 | Joannopoulos et al. |
| 2010/0102640 | A1 | 4/2010 | Joannopoulos et al. |
| 2010/0102641 | A1 | 4/2010 | Joannopoulos et al. |
| 2010/0117455 | A1 | 5/2010 | Joannopoulos et al. |
| 2010/0117456 | A1 | 5/2010 | Karalis et al. |
| 2010/0123353 | A1 | 5/2010 | Joannopoulos et al. |
| 2010/0123354 | A1 | 5/2010 | Joannopoulos et al. |

(Continued)

FOREIGN PATENT DOCUMENTS

| AU | 2006269374 B2 | 1/2007 |
| AU | 2006269374 C1 | 1/2007 |

(Continued)

OTHER PUBLICATIONS

Mar. 15, 2011 International Search Report issued in International Patent Application No. PCT/JP2010/071438.

Primary Examiner — Rexford Barnie
Assistant Examiner — Dru Parries
(74) Attorney, Agent, or Firm — Oliff & Berridge, PLC (57) ABSTRACT An electric power supply device generates electric power having a prescribed frequency. An electric power transfer unit receives electric power from the electric power supply device, and transfers electric power to an electric power receiving unit in a contactless manner by resonating with the electric power receiving unit via an electromagnetic field. An electric power sensor senses power reflected to the electric power supply device. A discharging coil unit externally discharges electric power output from the electric power supply device. A relay electrically connects the discharging coil unit between the electric power supply device and the electric power transfer unit when the reflected power detected has a value exceeding a predetermined value.

15 Claims, 5 Drawing Sheets (56) References Cited

U.S. PATENT DOCUMENTS

| | | |
|---|---|---|
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0156346 A1 | 6/2010 | Takada et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2011/0231029 A1 | 9/2011 | Ichikawa et al. |
| 2011/0241440 A1 | 10/2011 | Sakoda et al. |

FOREIGN PATENT DOCUMENTS

| | | |
|---|---|---|
| AU | 2007349874 A2 | 10/2008 |
| AU | 2010200044 A1 | 1/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | A-2009-501510 | 1/2009 |
| JP | A-2010-068634 | 3/2010 |
| JP | A-2010-070048 | 4/2010 |
| JP | A-2010-141976 | 6/2010 |
| JP | A-2010-154625 | 7/2010 |
| KR | 2008-0031398 A | 4/2008 |
| KR | 2010-0015954 A | 2/2010 |
| WO | WO 2007/008646 A2 | 1/2007 |
| WO | WO 2008/118178 A1 | 10/2008 |
| WO | WO 2010/035321 A1 | 4/2010 |

WIRELESS ELECTRIC POWER FEEDING EQUIPMENT

TECHNICAL FIELD

The present invention relates to wireless electric power feeding equipment, and particularly to wireless electric power feeding equipment allowing an electric power transfer unit and an electric power receiving unit to resonate with each other via an electromagnetic field to feed electric power in a contactless manner.

BACKGROUND ART

Electric vehicles, hybrid vehicles and other electrically powered vehicles are gaining large attention as ecologically friendly vehicles. These vehicles have mounted therein an electric motor generating force to drive and thus cause the vehicle to travel, and a rechargeable electric power storage device storing therein electric power supplied to the electric motor. Note that hybrid vehicles include a vehicle having mounted therein an electric motor and in addition an internal combustion engine together therewith as power sources, and a vehicle having mounted therein an electric power storage device and in addition a fuel cell together therewith as direct current power supplies for driving the vehicle.

A hybrid vehicle is also known that, as well as an electric vehicle, allows an electric power supply external to the vehicle to charge an electric power storage device mounted in the vehicle. For example, a plug-in hybrid vehicle is known. This vehicle allows the electric power storage device to be charged from a general household electric power supply through a charging cable connecting a receptacle of an electric power supply provided in premises and a charging port of the vehicle.

On the other hand, an electric power transfer method without using an electric power supply cord or an electric power transfer cable, i.e., wireless power transfer, is gaining attention in recent years. There are three wireless electric power transfer techniques known as being promising, which are power transfer through electromagnetic induction, power transfer via microwaves, and power transfer through resonance.

Of these three techniques, power transfer through resonance causes a pair of resonators (e.g., a pair of coils) to resonate in an electromagnetic field (a near field) to transfer electric power through the electromagnetic field in a contactless manner, and can transfer large electric power of several kW over a relatively large distance of several meters (see WO2007/008646 (Patent Literature 1) for example).

CITATION LIST

Patent Literature

PTL 1: WO2007/008646
PTL 2: Japanese Patent Laying-Open No. 2010-068634
PTL 3: Japanese Patent Laying-Open No. 2010-070048
PTL 4: Japanese Patent Laying-Open No. 2010-154625

SUMMARY OF INVENTION

Technical Problem

When resonance is utilized to transfer electric power to feed an electrically powered vehicle or a similar mobile object with electric power, the mobile object, as it moves, varies a distance between a resonant coil of electric power feeding equipment and a resonant coil mounted in the mobile object and accordingly, a resonance system varies in impedance. When the resonance system's impedance and the electric power supply device's output impedance mismatch, it impairs efficiency of electric power transfer and increases power reflected to the electric power supply device. If the reflected power rapidly increases, it may damage the electric power supply device.

The present invention has been made to address this disadvantage, and it contemplates wireless electric power feeding equipment allowing an electric power transfer unit and an electric power receiving unit to resonate with each other via an electromagnetic field to feed an electric power receiving device with electric power in a contactless manner, that can prevent rapidly increased reflected power from damaging an electric power supply device.

Solution to Problem

The present invention provides wireless electric power feeding equipment for feeding electric power in a contactless manner to an electric power receiving device including an electric power receiving unit, comprising an electric power supply device, an electric power transfer unit, a detection device, a discharging coil, and a connection device. The electric power supply device generates electric power having a prescribed frequency. The electric power transfer unit receives electric power from the electric power supply device and transfers the electric power to the electric power receiving unit in a contactless manner by resonating with the electric power receiving unit via an electromagnetic field. The detection device detects power reflected to the electric power supply device. The discharging coil externally discharges electric power output from the electric power supply device. The connection device electrically connects the discharging coil between the electric power supply device and the electric power transfer unit when the reflected power detected has a value exceeding a predetermined value.

Preferably, the wireless electric power feeding equipment further comprises an electromagnetic shielding material surrounding the discharging coil and opened only in one direction to allow the discharging coil to externally discharge electric power. The discharging coil and the electromagnetic shielding material are provided underground. The electromagnetic shielding material is disposed to have an opening facing away from the ground surface.

Preferably, the wireless electric power feeding equipment further comprises a variable impedance device provided between the electric power supply device and the electric power transfer unit for adjusting an input impedance of a resonance system configured of the electric power transfer unit and the electric power receiving unit, and the connection device electrically connects the discharging coil between the variable impedance device and the electric power transfer unit when the reflected power detected has the value exceeding the predetermined value.

Still preferably, the wireless electric power feeding equipment further comprises a controller operative in response to the reflected power detected having the value exceeding the predetermined value for operating the connection device and also modifying the variable impedance device in impedance to have a prescribed value.

Still preferably, the prescribed value is a value previously set to match the discharging coil in impedance to a space surrounding the discharging coil.

Preferably, the electric power transfer unit includes a primary coil and a primary self resonant coil. The primary coil receives electric power from the electric power supply device. The primary self resonant coil is fed with the electric power from the primary coil through electromagnetic induction and generates the electromagnetic field. The electric power receiving unit includes a secondary self resonant coil and a secondary coil. The secondary self resonant coil receives the electric power from the primary self resonant coil by resonating with the primary self resonant coil via the electromagnetic field. The secondary coil extracts through electromagnetic induction and outputs the electric power received by the secondary self resonant coil.

Preferably, the electric power receiving device is mounted in a vehicle.

Advantageous Effects of Invention

In the present invention, if reflected power sensed has a value exceeding a predetermined value, a discharging coil is electrically connected between an electric power supply device and a power transfer unit to externally discharge electric power output from the electric power supply device. The present invention can thus prevent rapidly increased reflected power from damaging the electric power supply device.

DESCRIPTION OF EMBODIMENTS

Hereinafter reference will be made to the drawings to describe the present invention in embodiments. In the figures, identical or corresponding components are identically denoted and will not be described repeatedly.

Figure 1:
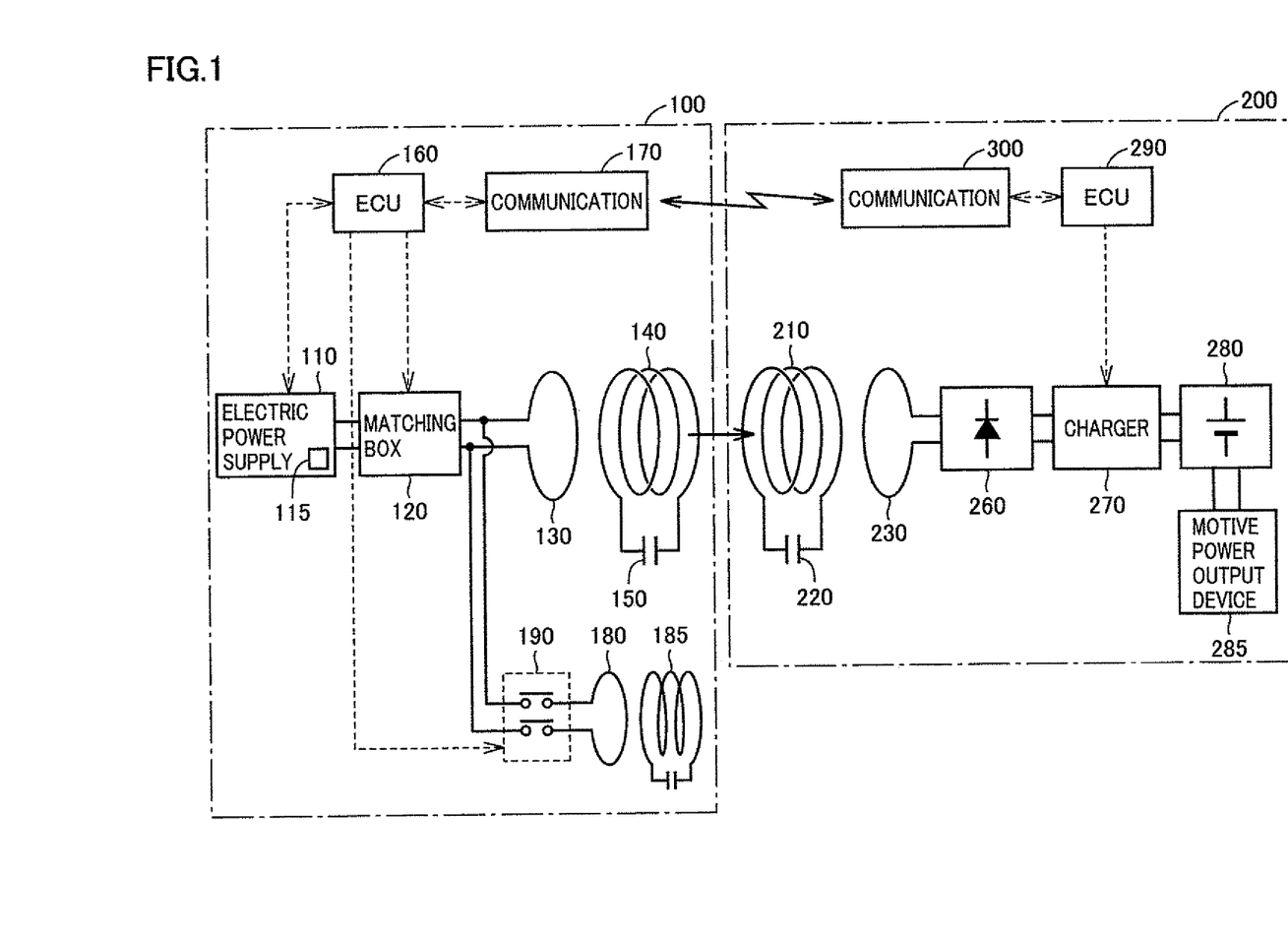
FIG. 1 generally shows a configuration of a wireless electric power feeding system by an embodiment of the present invention.

FIG. 1 generally shows a configuration of a wireless electric power feeding system by an embodiment of the present invention. With reference to FIG. 1, the wireless electric power feeding system includes electric power feeding equipment 100 and a vehicle 200.

Electric power feeding equipment 100 includes an electric power supply device 110, an electric power sensor 115, an impedance matching box 120, a primary coil 130, a primary self resonant coil 140, a capacitor 150, an electronic control unit (ECU) 160, and a communication device 170. Furthermore, electric power feeding equipment 100 further includes a coil 180, a discharging self resonant coil 185, and a relay 190.

Electric power supply device 110 generates electric power having a prescribed frequency. As an example, electric power supply device 110 receives electric power from a utility power supply (not shown) and generates electric power having a prescribed frequency of 1 MHz to less than 20 MHz. Electric power supply device 110 operates in response to an instruction received from ECU 160 to generate and stop electric power and control electric power output.

Electric power sensor 115 senses reflected power in electric power supply device 110, and outputs the sensed value to ECU 160. Note that reflected power is electric power output from electric power supply device 110 and reflected and returned to electric power supply device 110. Note that electric power sensor 115 can be various known sensors that can sense reflected power in the electric power supply device.

Impedance matching box 120 is provided between electric power supply device 110 and primary coil 130, and configured to have internal impedance variably.

Impedance matching box 120 operates in response to an instruction received from ECU 160 to vary impedance to match an input impedance of a resonance system including primary coil 130, primary self resonant coil 140 and capacitor 150, and a secondary self resonant coil 210, a capacitor 220 and a secondary coil 230, which will be described later, of a vehicle 200 to an output impedance of electric power supply device 110.

Figure 2:
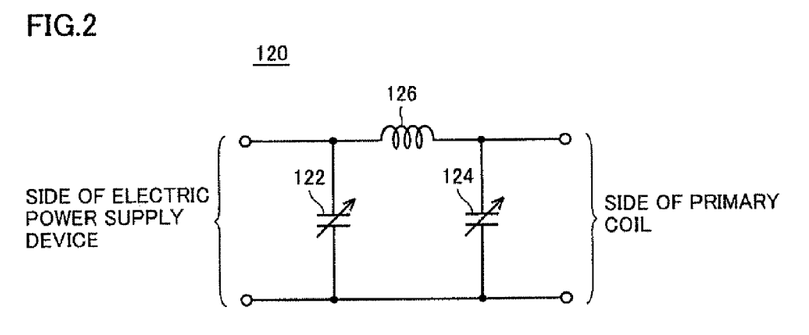
FIG. 2 is a circuit diagram showing an example of a circuit configuration of an impedance matching box shown in FIG. 1.

FIG. 2 is a circuit diagram showing an example of a circuit configuration of impedance matching box 120 shown in FIG. 1. With reference to FIG. 2, impedance matching box 120 includes variable capacitors 122, 124 and a coil 126. Variable capacitor 122 is connected to electric power supply device 110 (see FIG. 1) in parallel. Variable capacitor 124 is connected to primary coil 130 (see FIG. 1) in parallel. Coil 126 is connected at one of paired electric power lines that are disposed between electric power supply device 110 and primary coil 130 between connection nodes of variable capacitors 122, 124.

Impedance matching box 120 has at least one of variable capacitors 122, 124 varied in capacitance in response to an instruction received from ECU 160 (see FIG. 1) to provide variation in impedance. Impedance matching box 120 thus operates in response to an instruction received from ECU 160 to match the input impedance of the resonance system to the output impedance of electric power supply device 110.

Note that although not shown in the figure, coil 126 may be implemented as a variable coil varied in inductance to provide variable impedance.

Again with reference to FIG. 1, primary coil 130 is disposed to be substantially coaxial with primary self resonant coil 140 with a prescribed distance therebetween. Primary coil 130 is magnetically coupled with primary self resonant coil 140 through electromagnetic induction, and supplies high-frequency electric power that is received from electric power supply device 110 to primary self resonant coil 140 through electromagnetic induction.

Primary self resonant coil 140 receives electric power from primary coil 130 through electromagnetic induction, and resonates via an electromagnetic field with secondary self resonant coil 210, which will be described later, that is mounted in vehicle 200, and thus transfers electric power to secondary self resonant coil 210. Note that primary self resonant coil 140 is provided with capacitor 150. Capacitor 150 is connected for example between opposite ends of primary self resonant coil 140. Primary self resonant coil 140 has its coil diameter, number of turns, and capacitor's capacitance appropriately designed to provide a large Q-factor (for example, Q>100) and a large coupling coefficient κ and the like.

Note that primary coil 130 is provided to facilitate feeding electric power from electric power supply device 110 to primary self resonant coil 140, and primary coil 130 may be dispensed with and electric power supply device 110 may directly be connected to primary self resonant coil 140. Furthermore, a stray capacitance of primary self resonant coil 140 may be utilized to dispense with capacitor 150.

Coil 180 is configured to be electrically connectable by relay 190 to an electrical current path between impedance matching box 120 and primary coil 130. Coil 180 is disposed to be substantially coaxial with discharging self resonant coil 185 with a prescribed distance therebetween. When relay 190 is turned on, coil 180 receives electric power from the electrical current path between impedance matching box 120 and primary coil 130 and magnetically couples with discharging self resonant coil 185 through electromagnetic induction, and supplies the received electric power to discharging self resonant coil 185 through electromagnetic induction.

Discharging self resonant coil 185 is a coil for externally discharging increased reflected power. Discharging self resonant coil 185 has its coil diameter, number of turns, and capacitor's capacitance appropriately designed to match with the surrounding space in impedance, and when discharging self resonant coil 185 receives electric power from coil 180 through electromagnetic induction, it discharges the received electric power to the surroundings.

Note that coil 180 is also provided to facilitate feeding electric power to discharging self resonant coil 185, and coil 180 may be dispensed with and discharging self resonant coil 185 may be connectable via relay 190 to the electrical current path between impedance matching box 120 and primary coil 130. Furthermore, a stray capacitance of discharging self resonant coil 185 may be utilized to allow discharging self resonant coil 185 to dispense with a capacitor.

Relay 190 is provided on an electrical current path for electrically connecting coil 180 to the electrical current path between impedance matching box 120 and primary coil 130, and is turned on/off by ECU 160.

When electric power feeding equipment 100 feeds electric power to vehicle 200, ECU 160 receives from electric power sensor 115 a value of reflected power sensed by electric power sensor 115, and receives from communication device 170 how vehicle 200 receives electric power, such as the received electric power's voltage and current, as received by communication device 170. Furthermore, ECU 160 also receives information on a state of charge (SOC) of electric power storage device 280, which will be described later, mounted in vehicle 200, an instruction to start/end feeding electric power, and the like from communication device 170.

Then, ECU 160 performs a prescribed process by: software processing by executing a previously stored program by a central processing unit (CPU); and/or hardware processing by dedicated electronic circuitry.

Specifically, ECU 160 controls an operation of electric power supply device 110. Furthermore, ECU 160 adjusts impedance matching box 120 in impedance so that the resonance system's input impedance is matched to electric power supply device 110's output impedance.

Furthermore, ECU 160 turns on relay 190 when reflected power sensed has a value exceeding a predetermined value while electric power feeding equipment 100 feeds vehicle 200 with electric power. This electrically connects coil 180 to the electrical current path between impedance matching box 120 and primary coil 130. This allows a portion of reflected power to be supplied to coil 180 and discharged externally through discharging self resonant coil 185. Discharging self resonant coil 185 discharges electric power through an electric power discharging process, which will be described in detail later.

Communication device 170 is a communication interface for communicating with vehicle 200. Communication device 170 receives information, including how vehicle 200 receives electric power, electric power storage device 280's SOC and the like, from vehicle 200, and outputs the information to ECU 160.

Vehicle 200 includes secondary self resonant coil 210, capacitor 220, secondary coil 230, a rectifier 260, a charger 270, electric power storage device 280, a motive power output device 285, an ECU 290, and a communication device 300.

Secondary self resonant coil 210 resonates with primary self resonant coil 140 of electric power feeding equipment 100 via an electromagnetic field to receive electric power from primary self resonant coil 140. Note that secondary self resonant coil 210 is provided with capacitor 220. Capacitor 220 is connected for example between opposite ends of secondary self resonant coil 210. Secondary self resonant coil 210 has its coil diameter, its number of turns, and its capacitor 220's capacitance appropriately designed to provide a large Q-factor (for example, Q>100) and a large coupling coefficient κ and the like.

Secondary coil 230 is disposed to be substantially coaxial with secondary self resonant coil 210 with a prescribed distance therebetween. Secondary coil 230 is magnetically couplable with secondary self resonant coil 210 through electromagnetic induction, and extracts the electric power that secondary self resonant coil 210 has received through electromagnetic induction, and outputs it to rectifier 260.

Note that secondary coil 230 is provided to facilitate extracting electric power from secondary self resonant coil 210, and secondary coil 230 may be dispensed with and rectifier 260 may directly be connected to secondary self resonant coil 210. Furthermore, a stray capacitance of secondary self resonant coil 210 may be utilized to dispense with capacitor 220.

Rectifier 260 rectifies electric power (ac) extracted by secondary coil 230. Charger 270 receives direct current electric power output from rectifier 260, converts it in voltage to voltage and outputs it to electric power storage device 280 to charge it. Electric power storage device 280 is a rechargeable direct current power supply and formed for example of a lithium ion, nickel hydride or similarly rechargeable battery. Electric power storage device 280 stores electric power received from charger 270, and also stores regenerative electric power generated by motive power output device 285. Then, electric power storage device 280 supplies the stored electric power to motive power output device 285. Note that electric power storage device 280 may be implemented as a capacitor of large capacitance.

Motive power output device 285 uses electric power stored in electric power storage device 280 to generate force to drive and thus cause vehicle 200 to travel. Although not shown in particular, motive power output device 285 for example includes an inverter receiving electric power from electric power storage device 280, a motor driven by the inverter, a driving wheel driven by the motor, and the like. Note that motive power output device 285 may include an electric power generator for charging electric power storage device 280, and an engine that can drive the electric power generator.

Then, ECU 290 controls an operation of charger 270 by software processing by executing a previously stored program by a CPU, and/or by hardware processing by dedicated electronic circuitry. Communication device 300 is a communication interface for communicating with electric power feeding equipment 100. Communication device 300 receives information, including how vehicle 200 receives electric power, electric power storage device 280's SOC and the like, from ECU 290, and outputs the information to electric power feeding equipment 100.

This wireless electric power feeding system is provided with primary self resonant coil 140 and primary coil 130 for transferring electric power to vehicle 200, and in addition thereto, discharging self resonant coil 185 and coil 180 for externally discharging electric power output from electric power supply device 110. When electric power sensor 115 senses reflected power exceeding a threshold value, relay 190 is turned on to electrically connect coil 180 to the electrical current path between impedance matching box 120 and primary coil 130. Increased reflected power is thus discharged from discharging self resonant coil 185 to the surrounding space. Note that the above threshold value for reflected power is appropriately set based on the specification of electric power supply device 110.

Figure 3:
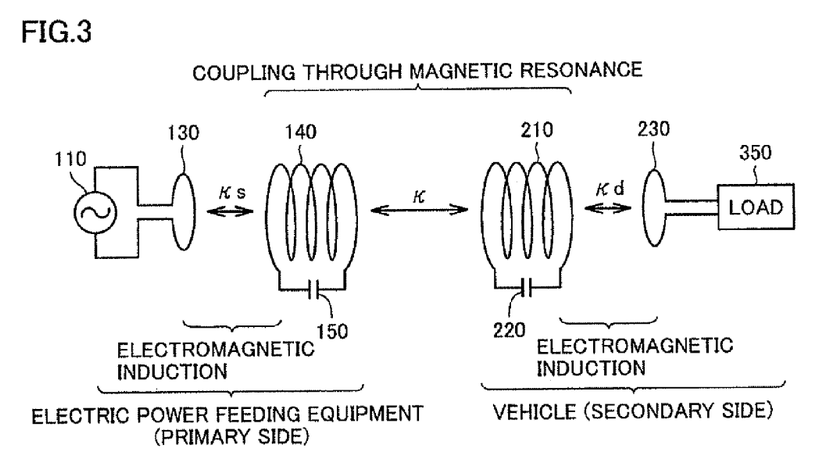
FIG. 3 is a figure for illustrating a principle of power transfer through resonance.

FIG. 3 is a figure for illustrating a principle of power transfer through resonance. With reference to FIG. 3, in the resonance, two LC resonant coils having the same natural frequency resonate, as two tuning forks do, in an electromagnetic field (a near field) so that one coil transfers electric power to the other coil via the electromagnetic field.

Specifically, primary coil 130 is connected to electric power supply device 110, and high-frequency electric power of 1 M to less than 20 MHz is fed to primary self resonant coil 140 magnetically coupled with primary coil 130 through electromagnetic induction. Primary self resonant coil 140 forms an LC resonator with capacitor 150, and resonates via an electromagnetic field (a near field) with secondary self resonant coil 210 having the same resonant frequency as primary self resonant coil 140. Then, energy (or electric power) moves from primary self resonant coil 140 via the electromagnetic field to secondary self resonant coil 210. Secondary self resonant coil 210 receives the energy (or electric power), which is in turn extracted by secondary coil 230 magnetically coupled with secondary self resonant coil 210 through electromagnetic induction, and is supplied to a load 350 following rectifier 260 (see FIG. 1). Note that electric power transfer through resonance is achieved when primary self resonant coil 140 and secondary self resonant coil 210 resonate with strength larger for example than 100 as represented as a Q-factor.

Figure 4:
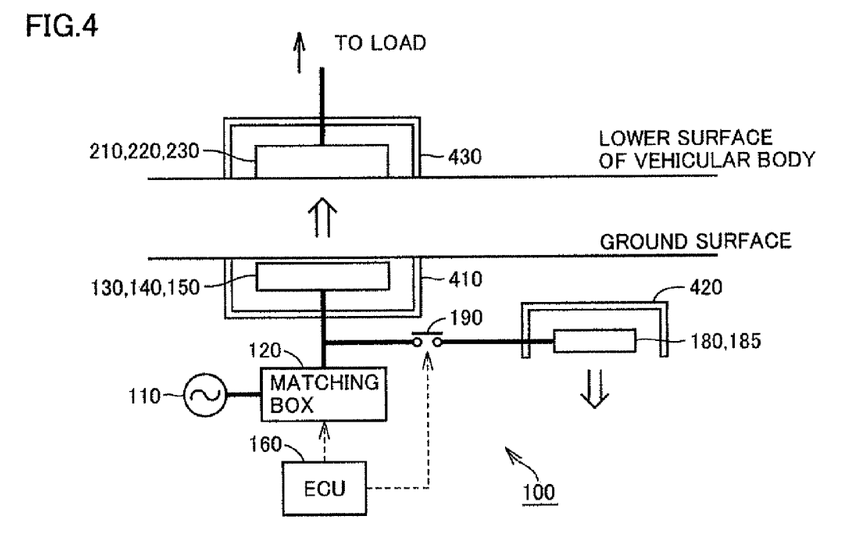
FIG. 4 is a figure for illustrating how in electric power feeding equipment an electric power transfer unit and a discharging coil unit are arranged.

FIG. 4 is a figure for illustrating how in electric power feeding equipment 100 an electric power transfer unit and a discharging coil unit are arranged. Note that in FIG. 4, a unit formed of primary coil 130, primary self resonant coil 140, and capacitor 150 (hereinafter also referred to as an "electric power transfer unit") is simply shown as a column. Similarly a unit formed of the vehicle 200 secondary self resonant coil 210, capacitor 220, and secondary coil 230 (hereinafter also referred to as an "electric power receiving unit") is also simplify shown as a column. Furthermore, a unit formed of coil 180 and discharging self resonant coil 185 (hereinafter also referred to as a "discharging coil unit") is also simply shown as a column.

With reference to FIG. 4, electric power feeding equipment 100 has the electric power transfer unit and the discharging coil unit underground. The electric power transfer unit is surrounded by a shield box 410, and the discharging coil unit is also surrounded by a shield box 420. Shield box 410 has a side thereof that is closer to the ground surface opened to allow electric power to be transferred to the electric power receiving unit of vehicle 200. In contrast, shield box 420 has a side thereof that faces away from the ground surface opened to discharge electric power underground. This allows the discharging coil unit to discharge electric power without discharging unintended electric power aboveground.

Note that vehicle 200 also has the electric power receiving unit surrounded by a shield box 430. Shield box 430 has a side thereof that is closer to the ground surface opened to be capable of receiving electric power from the electric power transfer unit of electric power feeding equipment 100.

Figure 5:
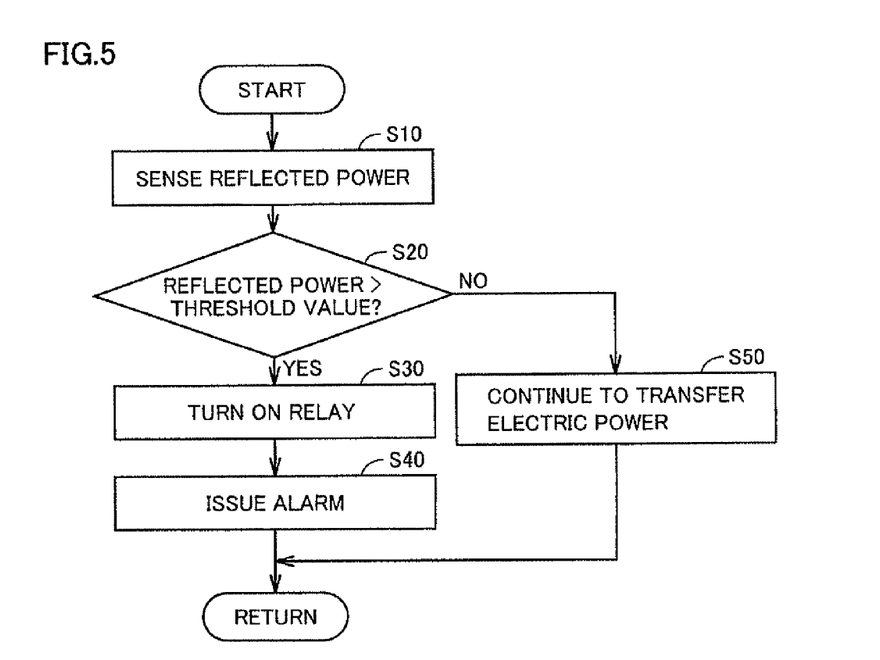
FIG. 5 is a flowchart of a process performed in the FIG. 1 electric power feeding equipment by an ECU when reflected power exceeding a threshold value is sensed.

FIG. 5 is a flowchart of a process performed in the FIG. 1 electric power feeding equipment 100 by ECU 160 when reflected power exceeding a threshold value is sensed. With reference to FIG. 5, ECU 160 receives from electric power sensor 115 power reflected to electric power supply device 110 sensed by electric power sensor 115 (see FIG. 1) (Step S10). Then, ECU 160 determines whether the reflected power sensed has a value larger than a predetermined threshold value (Step S20). Note that this threshold value is appropriately set based on the specification of electric power supply device 110.

If ECU 160 determines that the reflected power is larger than the threshold value (YES in Step S20), ECU 160 turns on relay 190 (see FIG. 1) (Step S30). This electrically connects coil 180 (see FIG. 1) to the electrical current path between impedance matching box 120 and primary coil 130, and increased reflected power is discharged to the surrounding space by discharging self resonant coil 185. Then, ECU 160 issues an alarm to inform the surroundings that the discharging coil unit is discharging electric power (Step S40).

In contrast, if it is determined in Step S20 that reflected power is equal to or smaller than the threshold value (NO in Step S20), ECU 160 does not turn on relay 190 and continues to transfer electric power to vehicle 200 (Step S50).

Thus in the present embodiment when reflected power sensed has a value exceeding a predetermined threshold value, a discharging coil unit is electrically connected between electric power supply device 110 and an electric power transfer unit to externally discharge electric power output from electric power supply device 110. This can prevent rapidly increased reflected power from damaging electric power supply device 110.

Exemplary Variation

When it is determined that electric power supply device 110 receives reflected power larger than the threshold value, relay 190 may be turned on, and in addition, impedance matching box 120 may be varied in impedance to match discharging self resonant coil 185 to the surrounding space in impedance. This provides an increased degree of freedom in designing the discharging coil unit.

Figure 6:
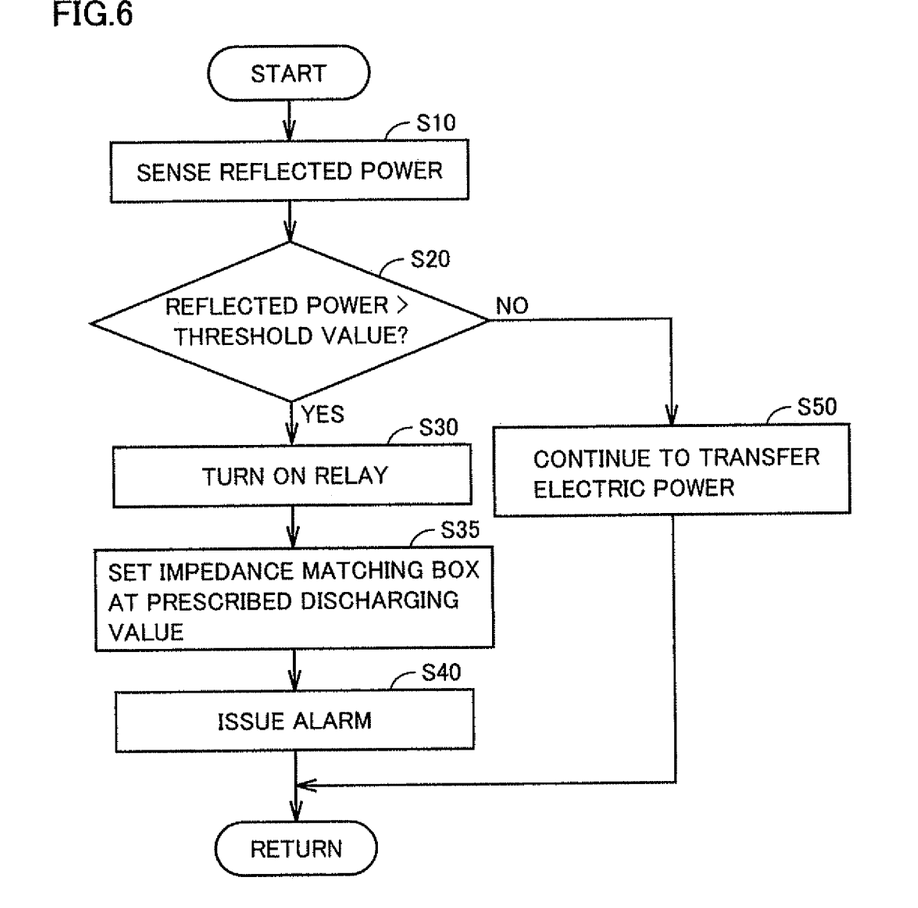
FIG. 6 is a flowchart of a process performed in electric power feeding equipment in an exemplary variation of the embodiment by an ECU when reflected power exceeding a threshold value is sensed.

FIG. 6 is a flowchart of a process performed in electric power feeding equipment 100 in the present exemplary variation by ECU 160 when reflected power exceeding a threshold value is sensed. With reference to FIG. 6, this flowchart corresponds to the FIG. 5 flowchart plus Step S35. That is, if relay 190 is turned on in Step S30, ECU 160 sets impedance matching box 120 at a prescribed discharging value (Step S35).

Note that this prescribed value is a value previously obtained so that a resonance system formed of discharging self resonant coil 185 and the surrounding space has an input impedance matched to the output impedance of electric power supply device 110. Once impedance matching box 120 has had its impedance changed to the prescribed value, ECU 160 proceeds to Step S40 to issue an alarm.

Thus this exemplary variation can prevent rapidly increased reflected power from damaging electric power supply device 110 and also allows the discharging coil unit to be designed with an increased degree of freedom.

Note that while the present embodiment and its exemplary variation provide a discharging coil unit to externally discharge excessive reflected power, the discharging coil unit may be replaced with a discharge resistor.

Figure 7:
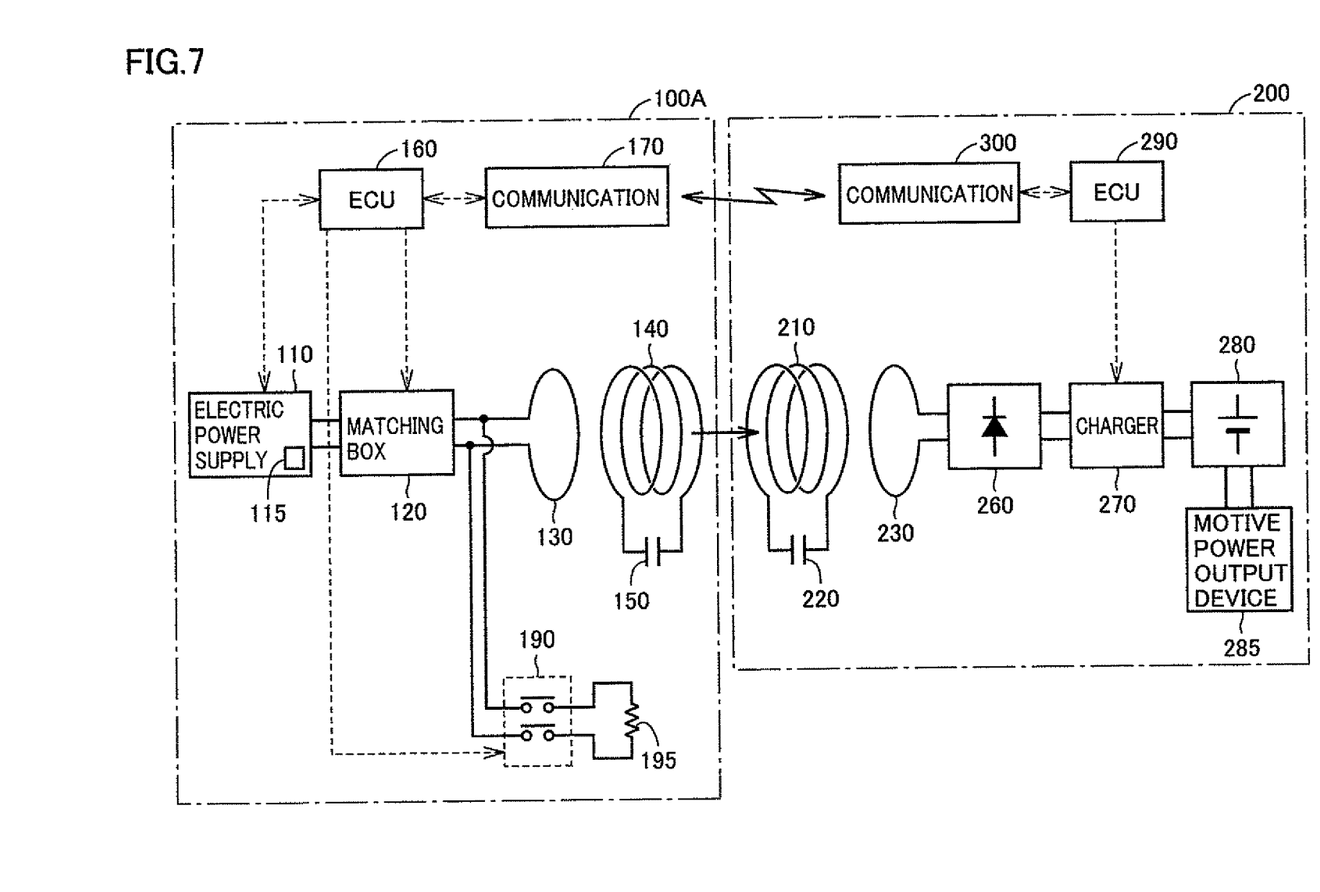
FIG. 7 generally shows a configuration of a wireless electric power feeding system having a discharging coil unit replaced with a discharge resistor.

FIG. 7 generally shows a configuration of a wireless electric power feeding system having a discharging coil unit replaced with a discharge resistor. With reference to FIG. 7, the wireless electric power feeding system includes electric power feeding equipment 100A and a vehicle 200A. Electric power feeding equipment 100A has the configuration of electric power feeding equipment 100 shown in FIG. 1 including a discharge resistor 195 in place of a discharging coil unit including coil 180 and discharging self resonant coil 185.

When reflected power sensed while electric power feeding equipment 100 feeds vehicle 200 with electric power has a value exceeding a predetermined value, relay 190 is turned on. This electrically connects discharge resistor 195 to the electrical current path between impedance matching box 120 and primary coil 130 to allow discharge resistor 195 to consume electric power to prevent reflected power from rapidly increasing.

Note that while the above embodiment causes the electric power feeding equipment 100 primary self resonant coil 140 and the vehicle 200 secondary self resonant coil 210 to resonate to transfer electric power, a pair of high dielectric disks may configure the electric power transfer unit and the electric power receiving unit. The high dielectric disk is formed of a material having a large dielectric constant, e.g., $TiO_2$, $BaTi_4O_9$, $LiTaO_3$ and the like.

Note that in the above description, secondary self resonant coil 210, capacitor 220, and secondary coil 230 form one embodiment of an "electric power receiving unit" in the present invention, and primary coil 130, primary self resonant coil 140, and capacitor 150 form one embodiment of an "electric power transfer unit" in the present invention. Furthermore, electric power sensor 115 corresponds to one embodiment of a "detection device" in the present invention, and discharging self resonant coil 185 and coil 180 form one embodiment of a "discharging coil" in the present invention. Furthermore, relay 190 corresponds to one embodiment of a "connection device" in the present invention, and shield box 420 corresponds to one embodiment of an "electromagnetic shielding material" in the present invention. Furthermore, impedance matching box 120 corresponds to one embodiment of a "variable impedance device" in the present invention, and ECU 160 corresponds to one embodiment of a "controller" in the present invention.

It should be understood that the embodiments disclosed herein are illustrative and non-restrictive in any respect. The scope of the present invention is defined by the terms of the claims, rather than the above description of the embodiments, and is intended to include any modifications within the scope and meaning equivalent to the terms of the claims.

REFERENCE SIGNS LIST 100, 100A: electric power feeding equipment; 110: electric power supply device; 115: electric power sensor; 120: impedance matching box; 122, 124: variable capacitor; 126: coil; 130: primary coil; 140: primary self resonant coil; 150, 220: capacitor; 160, 290: ECU; 170, 300: communication device; 180: coil; 185: discharging self resonant coil; 190: relay; 195: discharge resistor; 200: vehicle; 230: secondary coil; 260: rectifier; 270: charger; 280: electric power storage device; 285: motive power output device; 350: load; 410, 420, 430: shield box.

The invention claimed is:

1. Wireless electric power feeding equipment for feeding electric power in a contactless manner to an electric power receiving device including an electric power receiving unit, comprising:
    an electric power supply device generating electric power having a prescribed frequency;
    an electric power transfer unit for receiving electric power from said electric power supply device and for transferring the electric power to said electric power receiving unit in a contactless manner by resonating with said electric power receiving unit via an electromagnetic field;
    a detection device for detecting power reflected to said electric power supply device;
    a discharging device configured of one of a discharging coil for externally discharging electric power output from said electric power supply device and a resistor for consuming electric power output from said electric power supply device; and
    a connection device electrically connecting said discharging device between said electric power supply device and said electric power transfer unit when the reflected power detected has a value exceeding a predetermined value.

2. The wireless electric power feeding equipment according to claim 1,
    said discharging device being said discharging coil,
    the equipment further comprising an electromagnetic shielding material surrounding said discharging coil and also opened only in one direction to allow said discharging coil to externally discharge electric power, wherein:
    said discharging coil and said electromagnetic shielding material are provided underground; and
    said electromagnetic shielding material is disposed to have an opening facing away from a ground surface.

3. The wireless electric power feeding equipment according to claim 1, further comprising a variable impedance device provided between said electric power supply device and said electric power transfer unit for adjusting an input impedance of a resonance system configured of said electric power transfer unit and said electric power receiving unit, wherein
    said connection device electrically connects said discharging device between said variable impedance device and said electric power transfer unit when the reflected power detected has the value exceeding said predetermined value.

4. The wireless electric power feeding equipment according to claim 3, further comprising a controller operative in response to the reflected power detected having the value exceeding said predetermined value for operating said connection device and also modifying said variable impedance device in impedance to have a prescribed value.

5. The wireless electric power feeding equipment according to claim 4, wherein:
    said discharging device is said discharging coil; and
    said prescribed value is a value previously set to match said discharging coil in impedance to a space surrounding said discharging coil.

6. The wireless electric power feeding equipment according to claim 1, wherein:
    said electric power transfer unit includes a primary coil receiving electric power from said electric power supply device, and a primary self resonant coil fed with the electric power from said primary coil through electromagnetic induction and generating said electromagnetic field; and said electric power receiving unit includes a secondary self resonant coil receiving the electric power from said primary self resonant coil by resonating with said primary self resonant coil via said electromagnetic field, and a secondary coil extracting through electromagnetic induction and outputting the electric power received by said secondary self resonant coil.

7. The wireless electric power feeding equipment according to claim 1, wherein said electric power receiving device is mounted in a vehicle.

8. The wireless electric power feeding equipment according to claim 2, wherein:

said electric power transfer unit includes a primary coil receiving electric power from said electric power supply device, and a primary self resonant coil fed with the electric power from said primary coil through electromagnetic induction and generating said electromagnetic field; and said electric power receiving unit includes a secondary self resonant coil receiving the electric power from said primary self resonant coil by resonating with said primary self resonant coil via said electromagnetic field, and a secondary coil extracting through electromagnetic induction and outputting the electric power received by said secondary self resonant coil.

9. The wireless electric power feeding equipment according to claim 3, wherein:

said electric power transfer unit includes a primary coil receiving electric power from said electric power supply device, and a primary self resonant coil fed with the electric power from said primary coil through electromagnetic induction and generating said electromagnetic field; and said electric power receiving unit includes a secondary self resonant coil receiving the electric power from said primary self resonant coil by resonating with said primary self resonant coil via said electromagnetic field, and a secondary coil extracting through electromagnetic induction and outputting the electric power received by said secondary self resonant coil.

10. The wireless electric power feeding equipment according to claim 4, wherein:

said electric power transfer unit includes a primary coil receiving electric power from said electric power supply device, and a primary self resonant coil fed with the electric power from said primary coil through electromagnetic induction and generating said electromagnetic field; and said electric power receiving unit includes a secondary self resonant coil receiving the electric power from said primary self resonant coil by resonating with said primary self resonant coil via said electromagnetic field, and a secondary coil extracting through electromagnetic induction and outputting the electric power received by said secondary self resonant coil.

11. The wireless electric power feeding equipment according to claim 5, wherein:

said electric power transfer unit includes a primary coil receiving electric power from said electric power supply device, and a primary self resonant coil fed with the electric power from said primary coil through electromagnetic induction and generating said electromagnetic field; and said electric power receiving unit includes a secondary self resonant coil receiving the electric power from said primary self resonant coil by resonating with said primary self resonant coil via said electromagnetic field, and a secondary coil extracting through electromagnetic induction and outputting the electric power received by said secondary self resonant coil.

12. The wireless electric power feeding equipment according to claim 2, wherein said electric power receiving device is mounted in a vehicle.

13. The wireless electric power feeding equipment according to claim 3, wherein said electric power receiving device is mounted in a vehicle.

14. The wireless electric power feeding equipment according to claim 4, wherein said electric power receiving device is mounted in a vehicle.

15. The wireless electric power feeding equipment according to claim 5, wherein said electric power receiving device is mounted in a vehicle.

* * * * *